United States Patent
Salter et al.

(10) Patent No.: US 10,118,542 B1
(45) Date of Patent: Nov. 6, 2018

(54) VEHICLE SIDE LIGHTING ARRANGEMENT

(71) Applicant: Ford Global Technologies, LLC, Dearborn, MI (US)

(72) Inventors: Stuart C. Salter, White Lake, MI (US); Aaron Bradley Johnson, Allen Park, MI (US); Paul Kenneth Dellock, Northville, MI (US); Stephen Kenneth Helwig, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 15/585,727

(22) Filed: May 3, 2017

(51) Int. Cl.
*B60Q 1/26* (2006.01)
*B60Q 1/32* (2006.01)
*B60Q 1/46* (2006.01)
*B60Q 1/48* (2006.01)
*B60Q 9/00* (2006.01)

(52) U.S. Cl.
CPC .............. *B60Q 1/32* (2013.01); *B60Q 1/2607* (2013.01); *B60Q 1/2619* (2013.01); *B60Q 1/46* (2013.01); *B60Q 1/48* (2013.01); *B60Q 9/002* (2013.01); *B60Q 2400/20* (2013.01)

(58) Field of Classification Search
CPC ...... H05B 37/0272; H05B 37/02; B60Q 4/30; B60Q 1/32; B60Q 1/2607; B60Q 1/2619; B60Q 1/46; B60Q 1/48; B60Q 9/002; B60Q 1/22; B60Q 1/26; B60Q 1/30; B60Q 1/303; B60Q 1/323
See application file for complete search history.

(56) References Cited

U.S. PATENT DOCUMENTS

| 5,801,340 A | 9/1998 | Peter |
| 6,946,853 B2 | 9/2005 | Gifford et al. |
| 8,333,492 B2 | 12/2012 | Dingman et al. |
| 8,482,303 B2 | 7/2013 | Van Gastel et al. |
| 9,447,613 B2 | 9/2016 | Salter et al. |
| 2005/0062597 A1* | 3/2005 | Su ..................... B60Q 1/2665 340/475 |
| 2006/0271261 A1* | 11/2006 | Flores .................. B60Q 9/008 701/49 |
| 2012/0287493 A1* | 11/2012 | Kuhlman ............ B60Q 1/085 359/228 |

(Continued)

FOREIGN PATENT DOCUMENTS

| CN | 2749729 Y | 1/2006 |
| CN | 102555966 A | 7/2012 |

(Continued)

*Primary Examiner* — Thai Pham
(74) *Attorney, Agent, or Firm* — Jason Rogers; Price Heneveld LLP

(57) ABSTRACT

A vehicle comprising: a front, a rear, a first side, and a second side; a first light capable of emitting light from the first side; a controller in communication with the first light; an exterior sensor that provides data to the controller, which determines whether an object is approaching the first side of the vehicle; and the controller causes the first light to emit light from the first side, when the controller determines that an object is approaching the first side. The first light is capable of emitting flashing light in a first color; and the controller causes the first light to emit flashing light in the first color, when the controller determines that an object is approaching the first side.

20 Claims, 13 Drawing Sheets

(56) References Cited

U.S. PATENT DOCUMENTS

2017/0166125 A1\* 6/2017 Lisseman ............... B60Q 9/008

FOREIGN PATENT DOCUMENTS

| CN | 202782871 U | 3/2013 |
| --- | --- | --- |
| DE | 4305653 A1 | 3/1994 |
| EP | 1450489 A1 | 8/2004 |
| JP | 2000085462 A | 3/2000 |
| JP | 2007321365 A | 12/2007 |
| KR | 20130050468 A | 5/2013 |

\* cited by examiner

VEHICLE SIDE LIGHTING ARRANGEMENT

FIELD OF THE INVENTION

The present invention generally relates to the arrangement of light emitted from the side of a vehicle and the use of the emitted light to provide various visually communicative signals.

BACKGROUND OF THE INVENTION

The exterior front and rear of a vehicle typically use lights to improve visibility for the operator of the vehicle. However, the sides of a vehicle do not strategically utilize lights.

SUMMARY OF THE INVENTION

According to a first aspect of the present invention, a vehicle comprises: a front, a rear, a first side, and a second side; a first light capable of emitting light from the first side; a controller in communication with the first light; an exterior sensor that provides data to the controller, which determines whether an object is approaching the first side of the vehicle; and the controller causes the first light to emit light from the first side, when the controller determines that an object is approaching the first side.

Embodiments of the first aspect of the invention can include any one or a combination of the following features:
   The first light is capable of emitting flashing light in a first color; and the controller causes the first light to emit flashing light in the first color, when the controller determines that an object is approaching the first side;
   The vehicle further comprises a second light that is capable of emitting light in a second color from the first side; and the controller causes the second light to emit light in the second color, when the controller determines that an object is approaching the first side;
   The vehicle further comprises a first passenger door located at the first side, a forward wheel located at the first side, and a rear wheel located at the first side; wherein, the first light emits light from the first side between the rear of the vehicle and the rear wheel; and wherein, the second light emits light from the first side between the rear wheel and the front of the vehicle.
   The vehicle further comprises a third light that is capable of emitting light in the second color from the first side; the third light emits light in the second color, when the controller determines that an object is approaching the first side; wherein, the second light emits light from the first passenger door or below the first passenger door; and wherein, the third light emits light from the first side between the forward wheel and the front of the vehicle;
   The first passenger door and the first side each comprise an external surface and an interior area to the interior of the external surface; wherein, the first light emits light from the interior area of the first side; wherein, the second light emits light from the interior area of the first passenger door or from the interior area of the first side below the first passenger door; and wherein, the third light emits light from the interior area of the first side;
   The vehicle further comprising: a reverse movement state; a second passenger door located at the first side between the first passenger door and the rear of the vehicle, the second passenger door comprising an external surface and an interior area to the interior of the external surface; and a fourth light that emits light in the second color when the controller determines that an object is approaching the first side; wherein, the fourth light emits light from the interior area of the second passenger door or from the interior area of the first side below the second passenger door; and wherein, the first light, the second light, the third light, and the fourth light emit light only when the controller determines that an object is approaching the first side while the vehicle is in the reverse movement state.

According to a second aspect of the present invention, a vehicle comprises: a front, a rear, a first side, and a second side; a passenger door located at the first side, the passenger door comprising an interior door handle and a door handle sensor; and a passenger door located at the first side, the passenger door comprising an interior door handle and a door handle sensor; and a light capable of emitting light from the first side; and a controller in communication with the door handle sensor and the light; wherein the light emits light from the first side when the controller, based on data from the door handle sensor, determines that a hand of a passenger is touching the interior door handle.

Embodiments of the second aspect of the invention can include any one or a combination of the following features:
   The door handle sensor is a capacitive sensor;
   The light emits light of a red color;
   The light emits flashing light of the red color;
   The light emits light from the passenger door;
   The light emits light from below the passenger door; and
   The passenger door comprises an external surface and an interior area to the interior of the external surface; wherein the light emits light from the interior area of the passenger door.

According to a third aspect of the present invention, a vehicle comprises: an interior, a front, a rear, a first side, a second side, and a first passenger door at the first side; a first light capable of emitting light from either the first passenger door or below the first passenger door; and a controller in communication with the first light; wherein the controller causes the first light to emit light from either the first passenger door or below the first passenger door when the controller determines that the vehicle intends to turn in the direction of the first side.

Embodiments of the third aspect of the invention can include any one or a combination of the following features:
   The controller causes the first light to emit blinking light alternating between a first color and a second color;
   The vehicle further comprises a forward wheel at the first side; and a second light in communication with the controller and capable of emitting light from the first side between the forward wheel and the front of the vehicle; wherein, the controller causes the second light to emit blinking light alternating between the first color and the second color; wherein, when the first light emits light in the first color, the second light emits light in the second color; and wherein, when the second light emits light in the first color, the first light emits light in the second color;
   The vehicle further comprises: a rear wheel at the first side; and a third light in communication with the controller, located at the first side between the rear wheel and the rear of the vehicle; wherein, the controller causes the third light to emit blinking light alternating between the first color and the second color; and wherein, third light emits light of the first color when the second light emits light of the first color;
   The interior comprises a turn indicator stalk in communication with the controller; wherein the turn indicator stalk has a first position when an operator of the vehicle does not intend to turn the vehicle and a second position when the operator of the vehicle intends to turn the vehicle; and the controller determines that the vehicle intends to turn in the direction of the first side because the turn indicator stalk is in the second position; and The vehicle further comprises: a second passenger door located at the first side between the first passenger door and the rear of the vehicle; and a fourth light, in communication with the controller, capable of emitting light from the second passenger door or from the first side below the second passenger door; wherein, the vehicle is an autonomous vehicle further comprising an autonomous vehicle control system that instructs the vehicle to indicate an upcoming turn in the direction of the first side; wherein, the controller determines that the vehicle intends to turn in the direction of the first side, based on data received from the autonomous vehicle control system; wherein, the controller causes the fourth light to emit blinking light alternating between the first color and the second color; and wherein, the fourth light emits light of the first color when the first light emits light of the first color.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
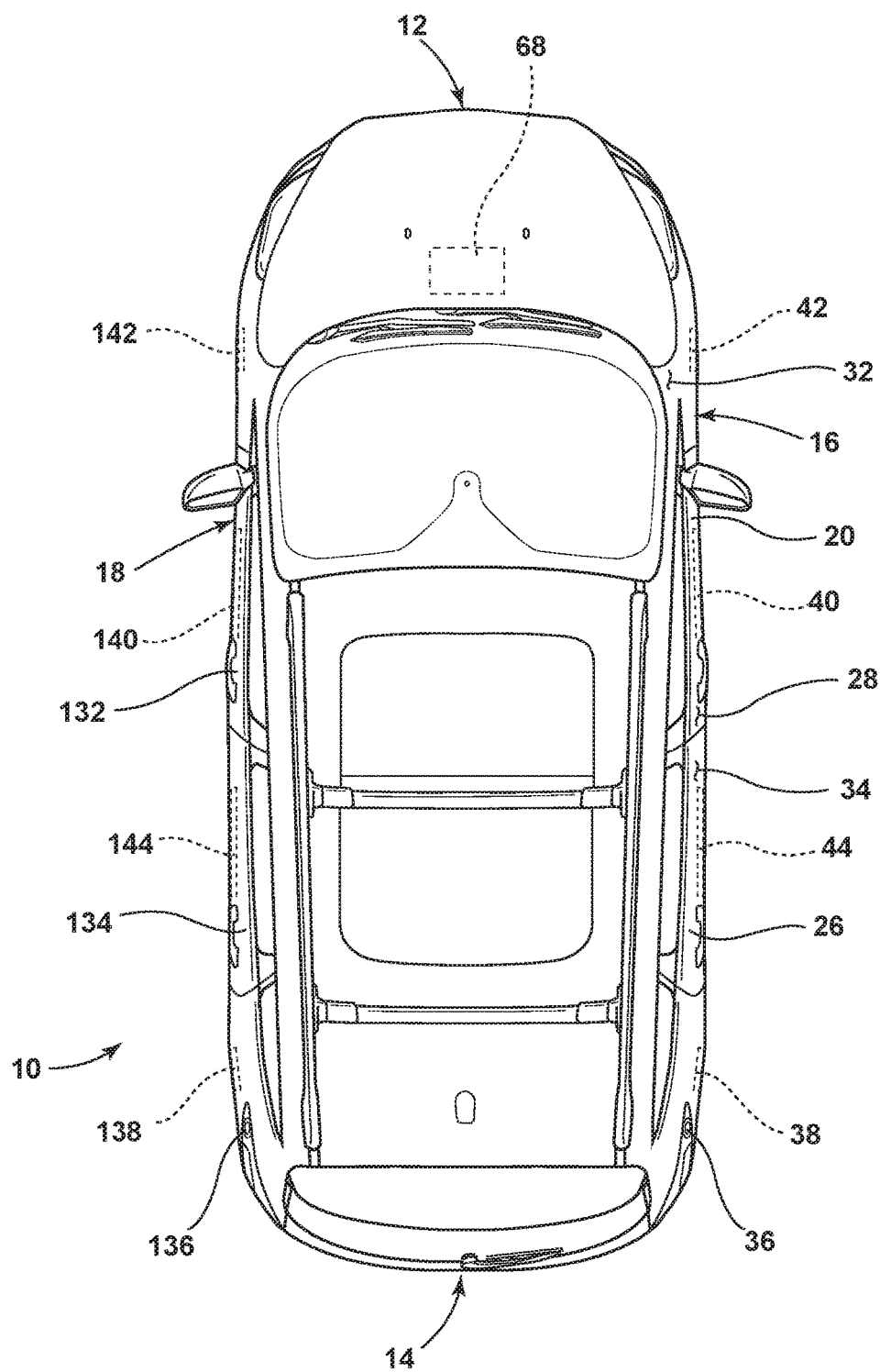
FIG. 1 is an overhead view of a vehicle, illustrating lights arranged to emit light from both a left side and a right side of the vehicle.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
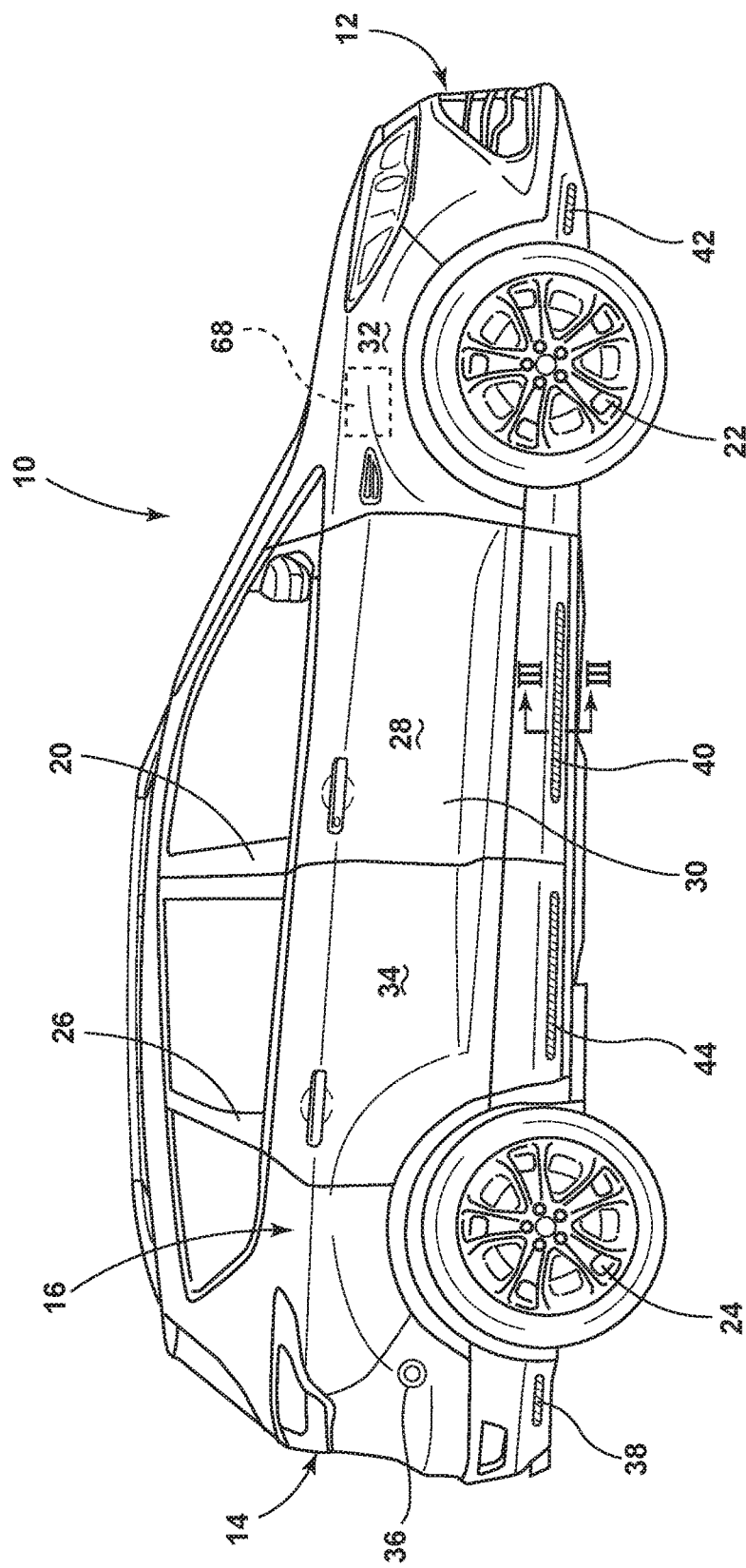
FIG. 2 is a side view of the vehicle of FIG. 1, illustrating a rear light, a forward light, a first passenger door light, and a second passenger door light arranged on the right side.

Referring to FIGS. 1 and 2, a vehicle 10 includes a front 12 and a rear 14. The vehicle 10 further includes a first and second side, that is, a right side 16 and a left side 18. The front 12 is the leading part of the vehicle 10 when the vehicle 10 is moving in a forward direction in a straight line. The rear 14 is the opposite side of the vehicle 10 from the front 12 and the leading part of the vehicle 10 when the vehicle 10 is moving in a reverse direction in a straight line. The sides of the vehicle 10, the right side 16 and the left side 18, generally include a passenger door. Accordingly, the vehicle 10 further includes a first passenger door 20 located at the right side 16. The first passenger door 20 is a door that a person would typically open to enter the vehicle 10 and become a passenger/occupant. The vehicle 10 further includes a forward wheel 22 and a rear wheel 24, both located at the right side 16. The forward wheel 22 is closer to the front 12 than the rear wheel 24, and the rear wheel 24 is closer to the rear 14 than the forward wheel 22. The vehicle 10 can further include a second passenger door 26 located at the right side 16. The second passenger door 26 is located between the first passenger door 20 and the rear 14 of the vehicle 10. The second passenger door 26 is likewise a door that a person would typically open to enter the vehicle 10 and become a passenger of the vehicle 10. The first passenger door 20 includes an external surface 28. The external surface 28 is the outside facing surface of an exterior door panel 30. The second passenger door 26 likewise includes an external surface 34, which is an outside facing surface of an exterior door panel 30. The right side 16 generally, like the first passenger door 20 and the second passenger door 26, includes an external surface 32, which is an outside facing surface of an exterior paneling. It should be understood that the left side 18 likewise includes a first passenger door 132, a second passenger door 134, a forward wheel, and a rear wheel arranged in the same manner and with the same features as their counterparts on the right side 16. The vehicle 10 can be a car, truck, van, among other things, and can be passenger operated or can be autonomously operated.

The vehicle 10 further includes, at the right side 16, an exterior sensor 36 that can be used to determine whether an object to the exterior of the vehicle 10 (such as another vehicle or a pedestrian) is approaching the right side 16 of the vehicle 10. Examples of such an exterior sensor 36 include a radar sensor and an ultrasonic sensor, which emit sound and electromagnetic waves respectively and receive waves that bounce back from the object. The exterior sensor 36 can thus provide data that can be used to determine the presence of an object, the distance of the object from the exterior sensor 36 (and thus a decreasing distance of the object from the exterior sensor 36), and the speed of the object. The exterior sensor 36 can be placed on the right side 16 of the vehicle 10, and emit and receive waves from the right side 16. An exterior sensor 136 is included on the left side 18 for the same purposes as its counterpart on the right side 16.

The right side 16 of the vehicle 10 further includes first, second, third, and fourth lights, namely a rear light 38, a first passenger door light 40, a forward light 42, and a second passenger door light 44. The rear light 38 emits light from the right side 16 between the rear 14 of the vehicle 10 and the rear wheel 24. The first passenger door light 40 emits light from the right side 16 between the rear wheel 24 and the front 12 of the vehicle 10, which can include emitting light from the first passenger door 20 or from below the first passenger door 20. The forward light 42 emits light from the right side 16 between the forward wheel 22 and the front 12 of the vehicle 10. The second passenger door light 44 emits light from the right side 16 between forward wheel 22 and the rear wheel 24, such as from the second passenger door 26 or from below the second passenger door 26. The left side 18 further includes a rear light 138, a first passenger door light 140, a forward light 142, and a second passenger door light 144 that are identically arranged as their right side 16 counterparts and operate in the same manner as discussed below for the corresponding lights of the first side 16.

The rear light 38, the first passenger door light 40, the forward light 42, and the second passenger door light 44 are each capable of emitting light in a variety of colors, including an amber color, a red color, a green color, and white (including but not limited to colors that the SAE and other international vehicle standard makers define as "amber," "red," "green," and "white" respectively for automotive signal lamps). The rear light 38, the first passenger door light 40, the forward light 42, and the second passenger door light 44 are each capable of flashing on and off, to providing flashing (blinking) light of one color or of alternating colors (such as alternative flashes of light in the green and amber colors). The rear light 38, the first passenger door light 40, the forward light 42, and a second passenger door light 44 can be anything that emits light upon command, including an LED or an array of LEDs, such as an array of LEDs linearly or rectangularly arranged to form a light bar, a light pipe, and a light blade. The LEDs and array of LEDs can include RGB LEDs, which can be controlled to produce white light or the light of any specific color among nearly limitless colors, or can include specific color producing LEDs. The rear light 38, the first passenger door light 40, the forward light 42, and the second passenger door light 44 can each emit light at separate times. The rear light 38, the first passenger door light 40, the forward light 42, and the second passenger door light 44 can each emit light at the same time in the same color or in different colors. The lights of the left side 18—the rear light 138, the first passenger door light 140, the forward light 142, and the second passenger door light 144—are all functionally identical to their right side 16 counterparts.

Figure 3:
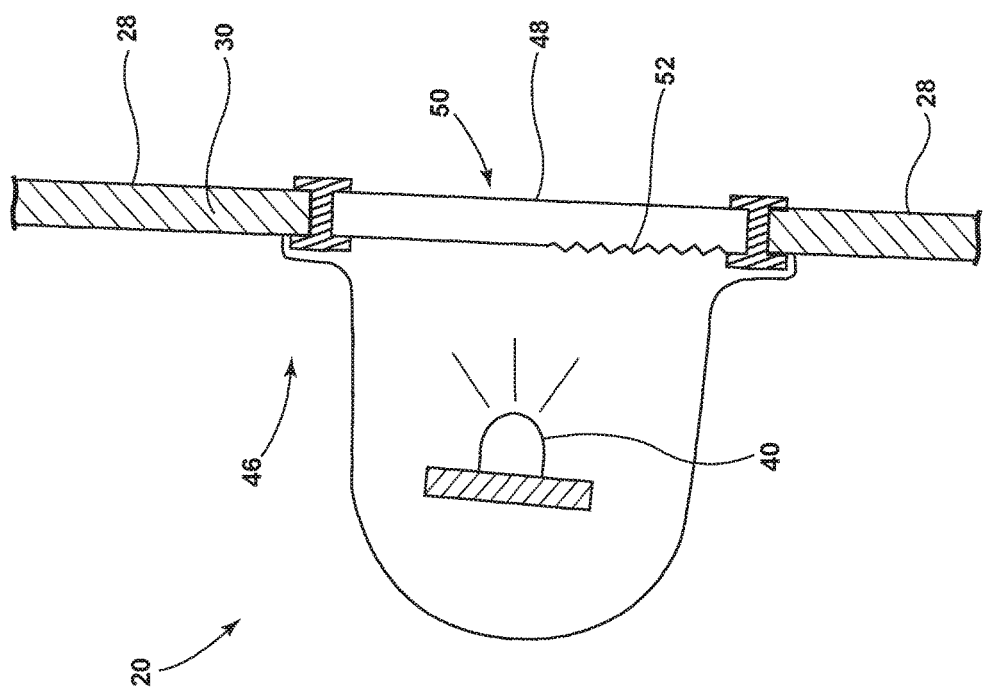
FIG. 3 is a cross-sectional view of the vehicle of FIG. 1 taken through line of FIG. 2, illustrating a light bar placed within the interior area of the first passenger door of the right side.

Referring to FIG. 3, the first passenger door 20 includes an interior area 46 to the interior of the external surface 28. In other words, the interior area 46 is the portion of the first passenger door 20 behind the exterior door panel 30. The interior area 46 typically houses a window regulator and the window pane when the window is retracted, among other things. Although not separately illustrated, it should be understood that the second passenger door 26 and the right side 16 each likewise include an interior area to the interior of the external surface 34 and the external surface 32 respectively. The first passenger door light 40 is illustrated emitting light from the interior area 46 of the first passenger door 20. More specifically, the first passenger door light 40 emits light to beyond the external surface 28 through a lens 48 and through an aperture 50 of the exterior door panel 30 surrounding the lens 48. If the first passenger door light 40 is placed below the first passenger door 20, instead of within the interior area 46 of the first passenger door 20, then the first passenger door light 40 emits light from the interior area of right side 16, that is, from behind the external surface 32 of the right side 16. In the same manner, the rear light 38 and forward light 42 emit light from the interior area, that is, from behind the external surface 32 of the right side 16. Likewise, the second passenger door light 44 emits light from the interior area of the second passenger door 26 or from the interior area of the right side 16 below the second passenger door 26. The lens 48 includes optical features 52 that focus the light emitted through the lens 48 generally outward and downward. The lights of the left side 18 (rear light 138, first passenger door light 140, forward light 142, and second passenger door light 144) all emit light from an interior area behind an external surface in a manner identical to their right side 16 counterparts.

Figure 4:
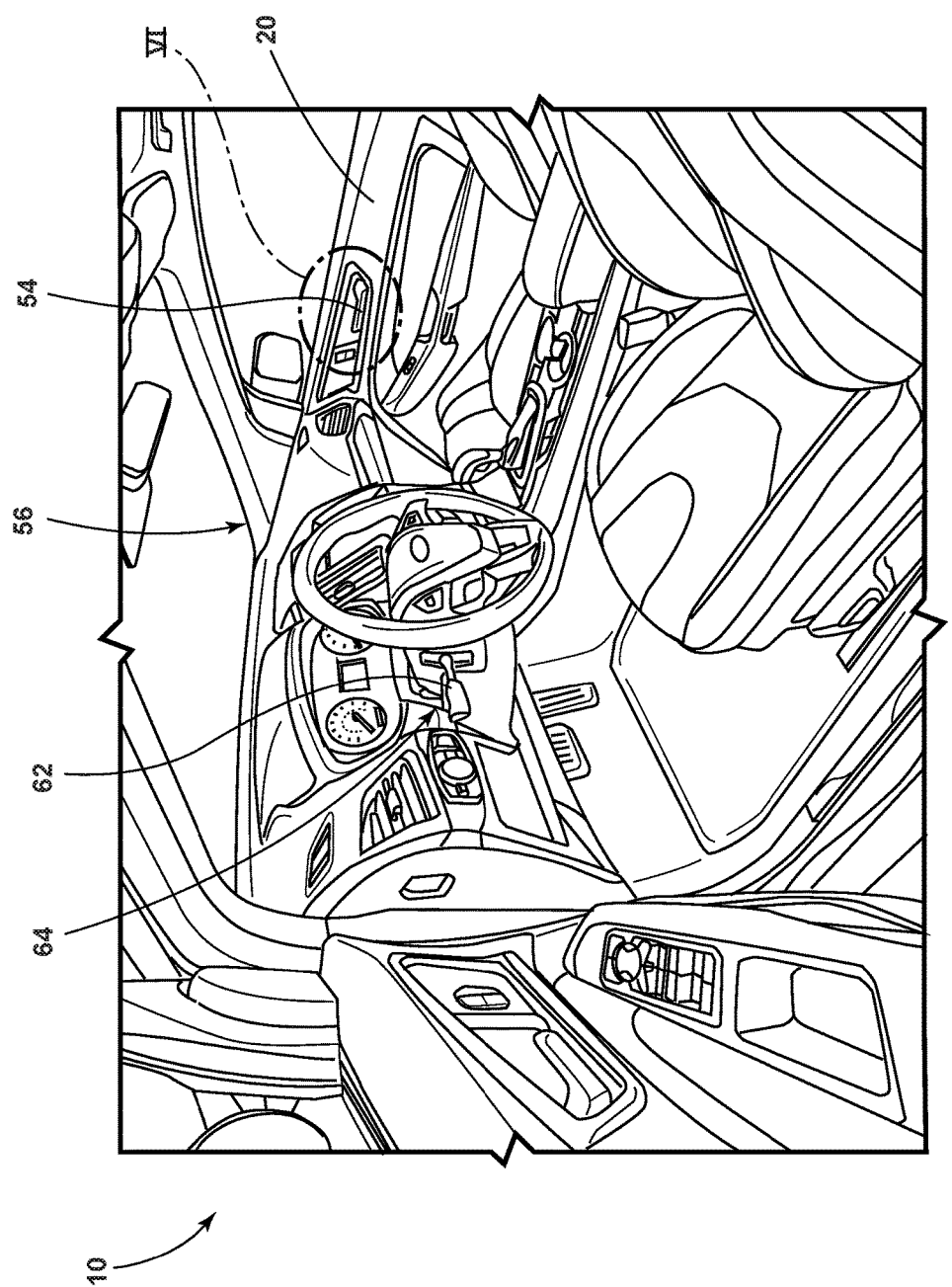
FIG. 4 is a perspective view of an interior of the vehicle of FIG. 1, illustrating a turn indicator stalk in a first position and an interior door handle for the first passenger door.
Figure 5:
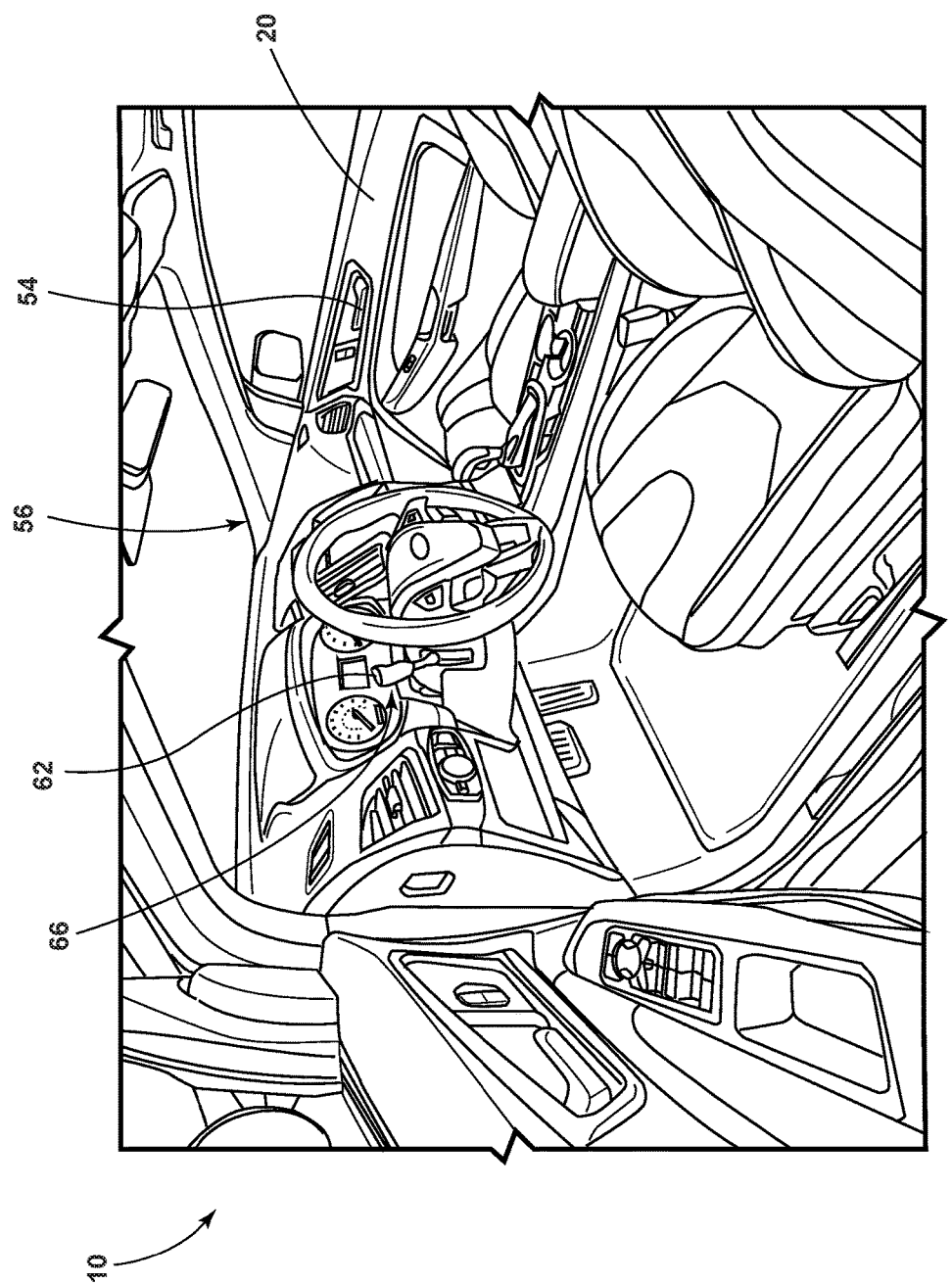
FIG. 5 is a perspective view of the interior of the vehicle of FIG. 1, illustrating the turn indicator stalk in a second position to indicate a turn.
Figure 6:
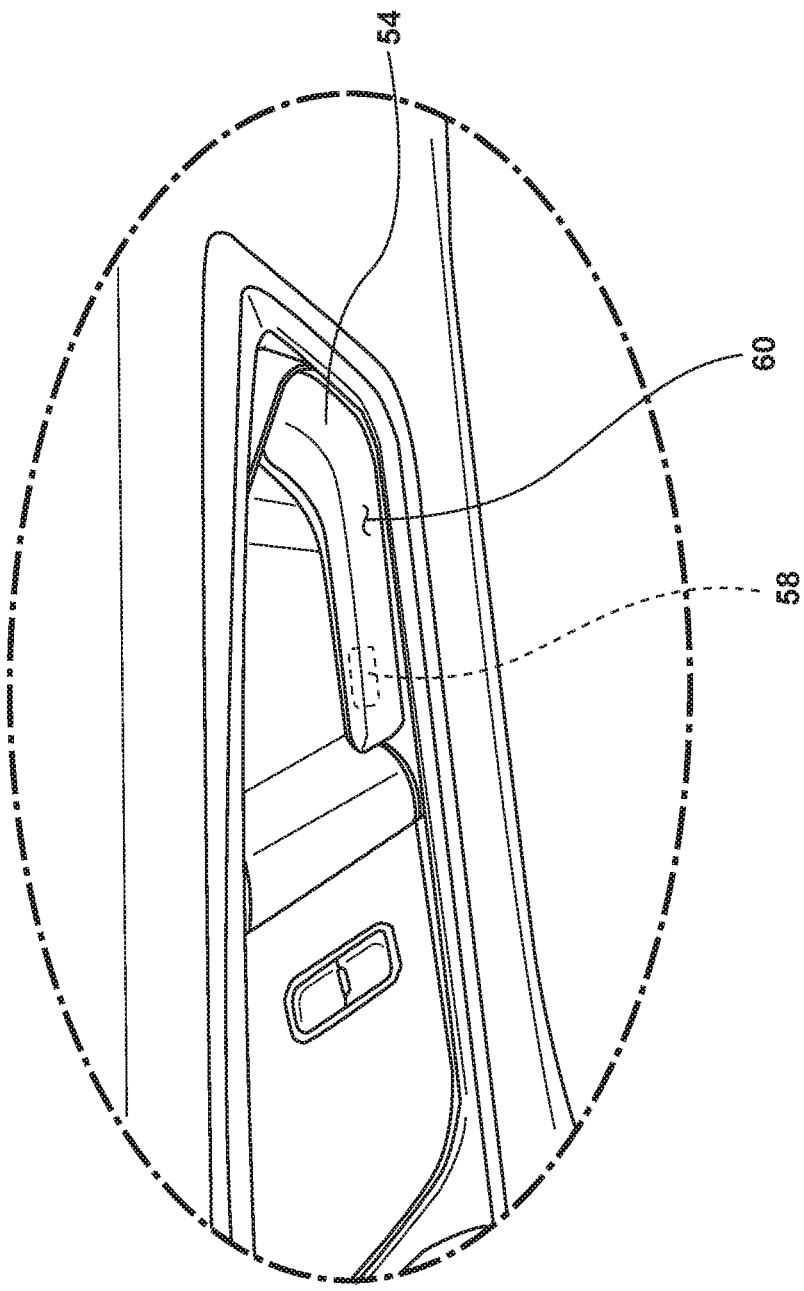
FIG. 6 is a close up view of area VI from FIG. 4, illustrating a door handle sensor within the interior door handle of FIG. 4 of the vehicle of FIG. 1.

Referring to FIGS. 4-6, the first passenger door 20 includes an interior door handle 54 accessible from an interior 56 of the vehicle 10. The interior door handle 54 includes a door handle sensor 58 that can be used to determine whether a hand of a passenger is touching the interior door handle 54. The door handle sensor 58 can be on the surface 60 of the interior door handle 54 or beneath the surface 60 of the interior door handle 54. In order to open the first passenger door 20 from the interior of the vehicle 10, the passenger typically uses the hand to grab and then pull the interior door handle 54. The door handle sensor 58 can be a capacitive sensor, which has a natural capacitance level. As an object approaches a capacitive sensor, the capacitance of the sensor changes. The closer an object is to the capacitive sensor, the more the capacitance changes. Thus, when the hand of the passenger is sufficiently near the capacitive sensor, such as when the hand of the passenger has grabbed the interior door handle 54 that includes the door handle sensor 58, the change in capacitance of the door handle sensor 58 will have passed a threshold level, from which it can be assumed that the passenger is grabbing the interior door handle 54 in an attempt to open the first passenger door 20. All other passenger doors of the vehicle 10—the second passenger door 26, the first passenger door 132, and the second passenger door 134—likewise include an interior door handle with a door handle sensor for the same purposes.

The interior 56 of the vehicle 10 includes a turn indicator stalk 62. The turn indicator stalk 62 is used to initiate a turn signal. Thus, the turn indicator stalk 62 has a first position 64 when an operator of the vehicle 10 does not intend to turn the vehicle 10. The turn indicator stalk 62 has a second position 66 when the operator of the vehicle 10 intends to turn the vehicle 10, such as an up position to indicate an intended turn in the direction of the right side 16, or a down position to indicate an intended turn in the direction of the left side 18.

Figure 7:
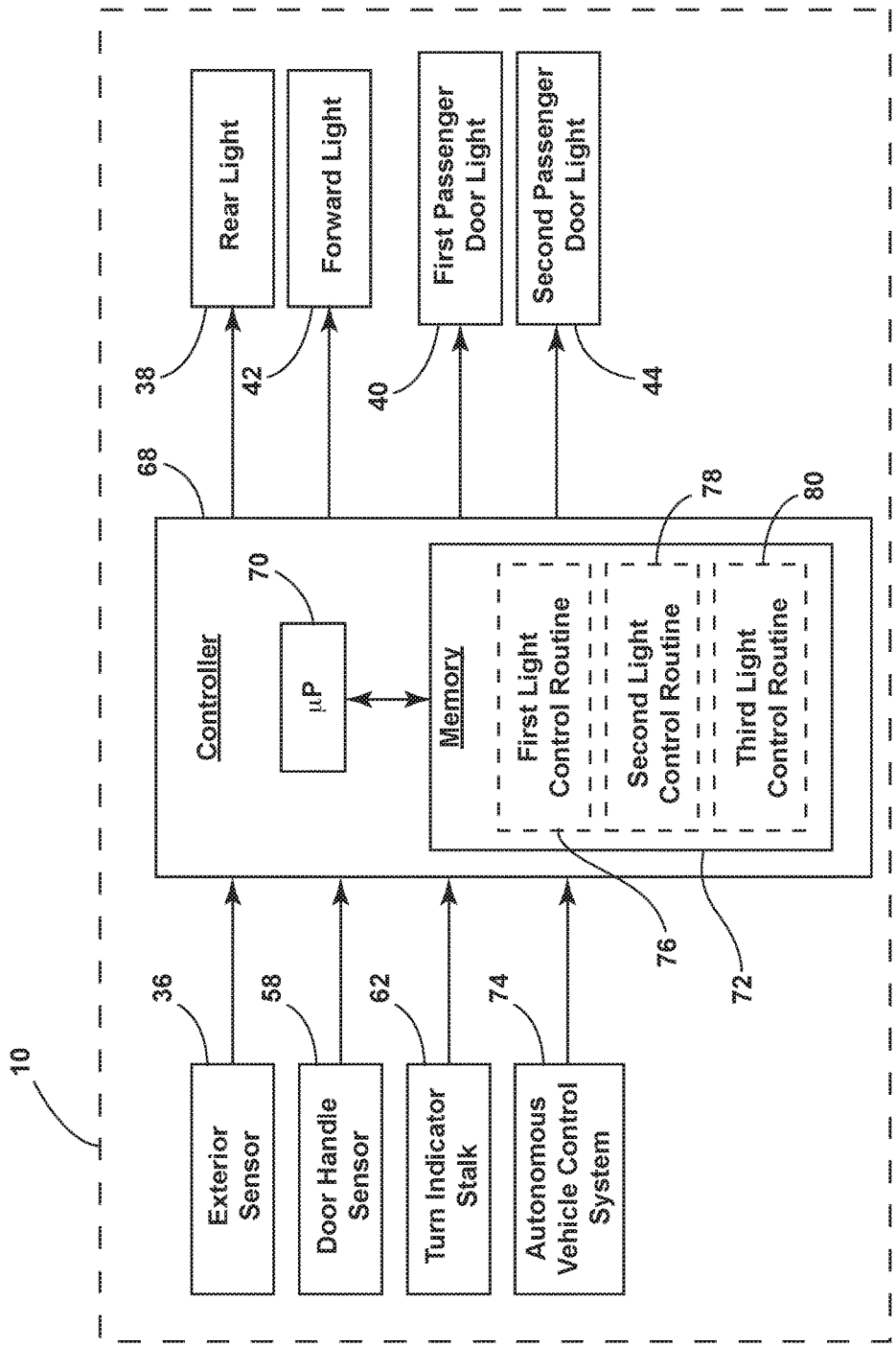
FIG. 7 is a schematic view of a controller for the vehicle of FIG. 1, illustrating several light control routines to control the lights on the right side of the vehicle.

Referring now to FIG. 7, the vehicle 10 further includes a controller 68. The controller 68 may include control circuitry such as a microprocessor 70 and memory 72. The controller 68 receives, as input, the data generated by the exterior sensor 36. The controller 68 additionally receives, as input, the data generated by the door handle sensor 58. The controller 68 additionally receives, as input, a signal generated by the position of the turn indicator stalk 62, such as whether the turn indicator stalk 62 is in the first position 64 or has been moved to the second position 66 (thus indicating an intended turn). The controller 68 additionally receives, as input, the data generated by an autonomous vehicle control system 74, if the vehicle 10 has autonomous driving capability.

The controller 68 is in communication with and controls the operation of the forward light 42, the rear light 38, the first passenger door light 40, and the second passenger door light 44. The memory 72 stores, and the microprocessor 70 executes, a first light control routine 76, based on the data generated by the exterior sensor 36. The memory 72 additionally stores, and the microprocessor 70 executes, a second light control routine 78, based on the data generated by the door handle sensor 58. The memory 72 additionally stores, and the microprocessor 70 executes, a third light control routine 80, based on the position of the turn indicator stalk 62 or the data provided by the autonomous vehicle control system 74.

Figure 8:
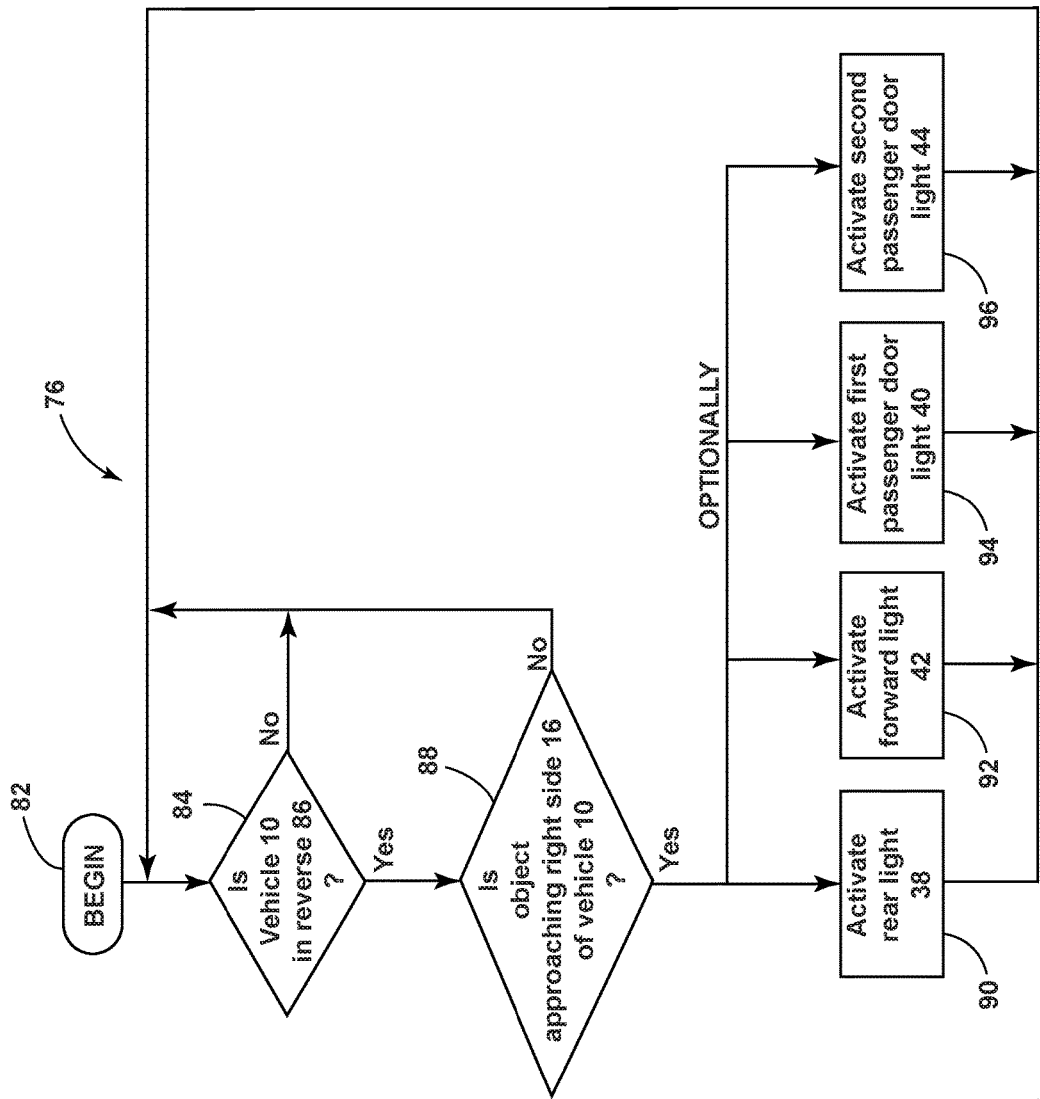
FIG. 8 is a flow chart for a first light control routine utilized by the controller of FIG. 7 to control the lights on the right side of the vehicle of FIG. 1.
Figure 9:
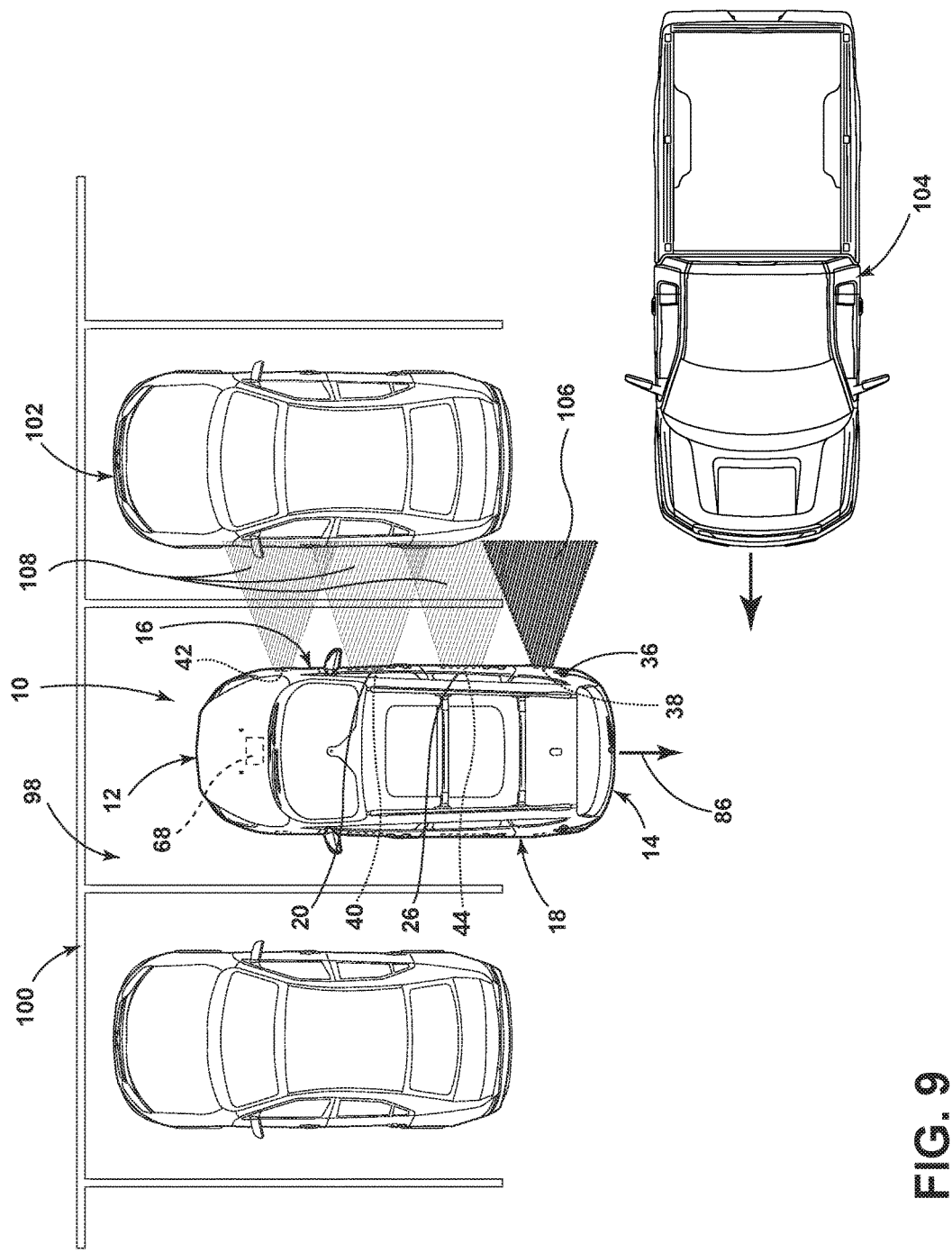
FIG. 9 is an overhead view of the vehicle of FIG. 1 reversing out of a parking spot while the rear light on the right side is flashing light in a first color because an exterior sensor provides data to the controller indicating another vehicle approaching the right side.

Referring now to FIGS. 8 and 9, the microprocessor 70 executes the first light control routine 76, beginning at step 82. As an optional threshold step, step 84, the first light control routine 76 determines whether the vehicle 10 is in a reverse movement state 86 (i.e., the vehicle 10 is in reverse gear, capable of moving backward). If so, then the first light control routine 76 proceeds to step 88. If not, then the first light control routine 76 returns to the beginning, step 82. At step 88, the first light control routine 76 determines, from the data provided by the exterior sensor 36, whether an object is approaching the right side 16 of the vehicle 10. Whether an object is approaching the right side 16 of the vehicle 10 can be based on whether various calculations pass a threshold level. For example, the controller 68 can determine that an object is approaching the right side 16 of the vehicle 10 if the controller 68 calculates, from the data provided by the exterior sensor 36, that the distance between the object and the exterior sensor 36 is decreasing and the object is within a predetermined distance from the vehicle 10 (e.g., the object is moving toward the exterior sensor 36 and is less than ten feet away from the exterior sensor 36). As another example, the controller 68 can determine that an object is approaching the right side 16 of the vehicle 10 if the controller 68 calculates, from the data provided by the exterior sensor 36, that the distance between the object and the exterior sensor 36 would decrease to a predetermined distance in predetermined amount of time (e.g., the object is moving toward the exterior sensor 36 and would be within two feet of the exterior sensor 36 within five seconds). If the controller 68 determines, based on the data provided to the controller 68 by the exterior sensor 36, that an object is not approaching the right side 16 of the vehicle 10, then the first light control routine 76 returns to the beginning, step 82. However, if the controller 68 determines that an object is approaching the right side 16 of the vehicle 10, then the first light control routine 76 proceeds to step 90, where the controller 68 causes a light, such as the rear light 38, to emit light of any color from the right side 16. For example, the controller 68 can cause the rear light 38 to emit flashing light in a first color 106, such as the red color. The rear light 38 emitting light when the controller 68 determines that an object is approaching the right side 16 provides a visual warning to the operator of the vehicle 10 that an object is approaching the right side 16 of the vehicle 10. In addition, the rear light 38 emitting light when the controller 68 determines that an object is approaching the right side 16 provides a visual warning to the object approaching the right side 16 of the vehicle 10 that the object is so approaching. In both instances, because of the visual warning, either the operator of the vehicle 10 or the object or both can thus implement measures to avoid a collision between the vehicle 10 and the object. The first light control routine 76 then returns to the beginning, step 82.

Simultaneously with step 90, the first light control routine 76 can, at steps 92, 94, and 96, optionally activate one or more of the first passenger door light 40, the forward light 42, and the second passenger door light 44, when the controller 68 determines that an object is approaching the right side 16. For example, the controller 68 can also cause one or more of the first passenger door light 40, the forward light 42, and the second passenger door light 44 to emit light of any color, including flashing light also in the first color 106 (e.g., the red color), while the controller 68 is causing the rear light 38 to emit flashing light in the first color 106 (e.g., the red color). Doing so would increase the impact of the visual warning that flashing light in the first color 106 (e.g., the red color) provides. Alternatively, at steps 92, 94, and 96, the controller 68 can cause one or more of the first passenger door light 40, the forward light 42, and the second passenger door light 44 to emit light in a second color 108 (e.g., the amber color), while the controller 68 is causing the rear light 38 to emit flashing light in the first color 106 (e.g., the red color), when the controller 68 determines that an object is approaching the right side 16. The first light control routine 76 then returns to the beginning, step 82.

The controller 68 utilizing the data that the exterior sensor 36 provides in this manner to control the operation of the rear light 38 and optionally one or more of the first passenger door light 40, the forward light 42, and the second passenger door light 44, is advantageous when the vehicle 10 was parked in a parking space 98 of a parking lot 100. Another parked vehicle 102 may be parked next to the right side 16 of the vehicle 10. The other parked vehicle 102 may thus partially block the view of the operator of the vehicle 10. When the vehicle 10 is in the reserve movement state 86, that is, the vehicle 10 is in reverse, and the operator is attempting to back out of the parking space 98, the operator may not see another object approaching the right side 16 of the vehicle 10, such as a moving vehicle 104. The controller 68 is able to determine, from the data that the exterior sensor 36 provides, that the object (e.g., the moving vehicle 104) is approaching the right side 16 of vehicle 10. The controller 68, executing the first light control routine 76, then activates the rear light 38 at step 90, and optionally one or more of the forward light 42, the first passenger door light 40, and the second passenger door light 44, at steps 92, 94, and 96, respectively, as explained above. The rear light 38 emitting light, such as a flashing light of the first color 106 (e.g., the red color) while the forward light 42, the first passenger door light 40, and the second passenger door light 44 emit light, such as a steady light of the second color 108 (e.g., the amber color), provides visual warning to the operator of both the vehicle 10 and the moving vehicle 104 that a collision is possible.

Figure 10:
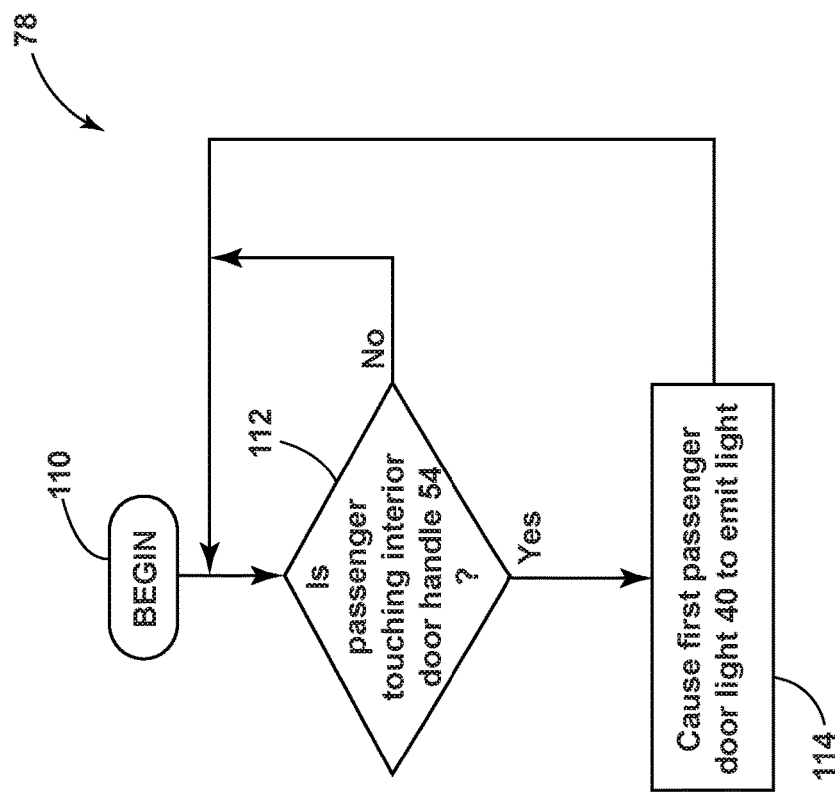
FIG. 10 is a flow chart for a second light control routine utilized by the controller of FIG. 7 to control the lights on the right side of the vehicle of FIG. 1.
Figure 11:
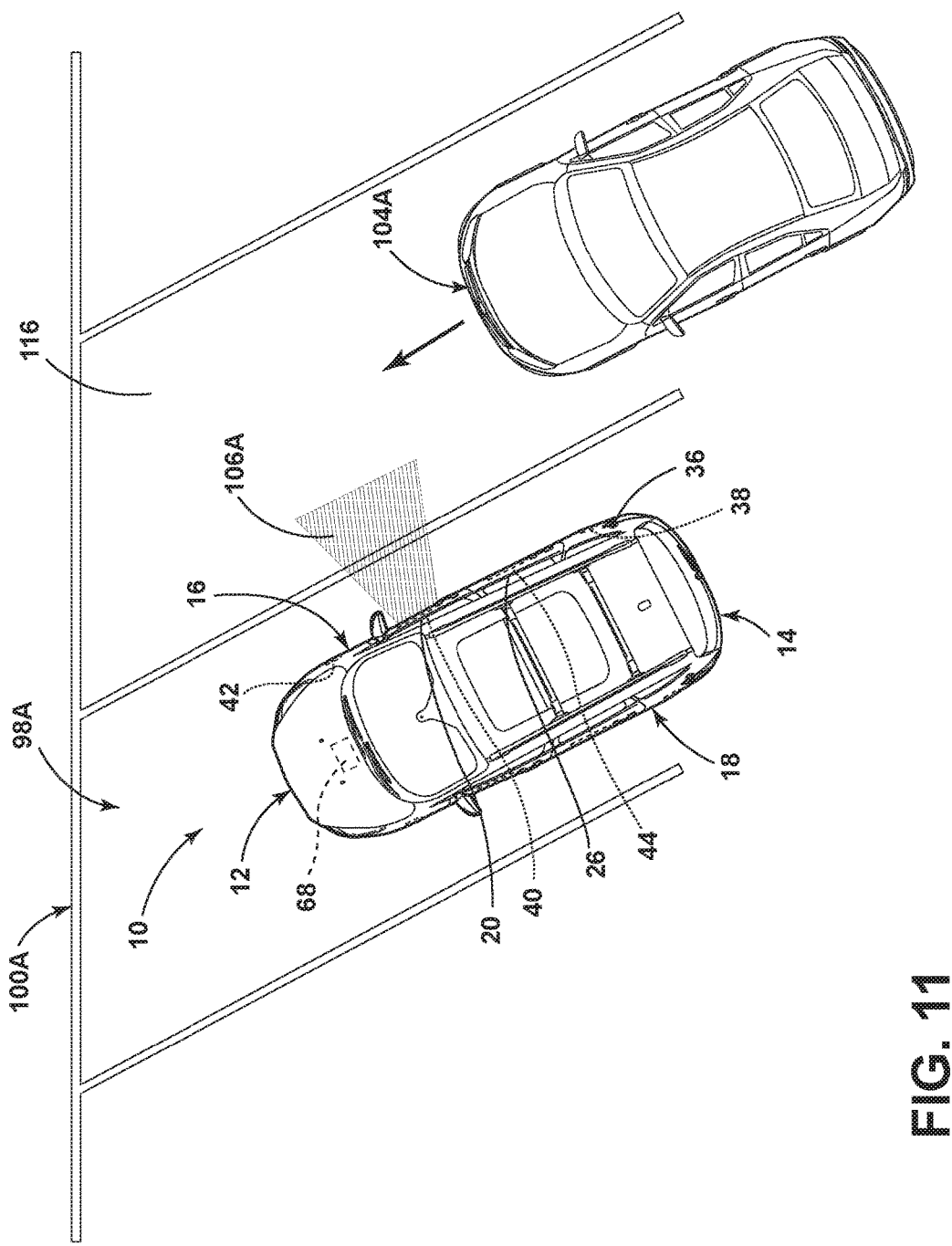
FIG. 11 is an overhead view of the vehicle of FIG. 1 parked in a parking space and a passenger has a hand on the interior door handle causing the first passenger door light to emit light, visually communicating to another vehicle entering an adjacent parking space.

Referring to FIGS. 10 and 11, the second light control routine 78 begins at step 110. The second light control routine 78 then proceeds to step 112, where it is determined whether a passenger is touching the interior door handle 54. The controller 68 determines whether a passenger is touching the interior door handle 54 based on the data that the controller 68 receives from the door handle sensor 58. The door handle sensor 58 will provide a certain natural input (such as a natural capacitance) when a passenger is not touching the interior door handle 54. The door handle sensor 58 will provide an increasingly changing input to the controller 68 (such as increasing change in capacitance) as the hand of the passenger gets closer to the interior door handle 54, eventually crossing a predetermined threshold change where it can be assumed that the hand of the passenger is touching the interior door handle 54. If the determination is no, then the second light control routine 78 returns to the beginning, step 110. If the determination is yes, then the second light control routine 78 proceeds to step 114. At step 114, the controller 68 causes a light, such as a light emitting light from within or below the passenger door utilizing the door handle sensor 58 that is being touched, such as the first passenger door light 40, to emit light. The second light control routine 78 then returns to the beginning, step 110.

The controller 68 thus causes the first passenger door light 40 to emit light when the controller 68 determines that the hand of a user is touching the interior door handle 54 of the first passenger door 20. The light emitted can be light of a first color 106A (e.g., the red color), and can be flashing light of the first color 106A (e.g., the red color). This is advantageous in a situation when a moving vehicle 104A is approaching the first passenger door 20 of the vehicle 10 when the passenger of the vehicle 10 is about to open the first passenger door 20. For example, as illustrated in FIG. 11, the vehicle 10 could be parked in a parking space 98A in a parking lot 100A, and the moving vehicle 104A could be entering a second parking space 116 that is adjacent the right side 16 of the vehicle 10. There is a danger that if the passenger opens the first passenger door 20, perhaps to exit the vehicle 10, that the moving vehicle 104A will hit the first passenger door 20 or the passenger. Because the controller 68 causes the first passenger door light 40 to emit light of the first color 106A (e.g., flashing light of the red color) when the passenger touches the interior door handle 54, the light of the first color 106A serves as visual warning to the moving vehicle 104A that the first passenger door 20 will open. The light of the first color 106A also serves as a visual reminder to the passenger to look for objects (such as pedestrians, other cars, bicycles) that are traveling in a path that the first passenger door 20 would impede if opened. It should be understood that the second passenger door 26, and any other passenger doors present on the vehicle 10, can likewise have an interior door handle with an associated door handle sensor. Further, the controller 68 can cause the second passenger door light 44, and any other light that emits light from or under any other passenger doors present on the vehicle 10, to emit light, when the controller 68 determines, based on data provided by the door handle sensor associated with such a door, that a hand of a passenger is touching the interior door handle.

Figure 12:
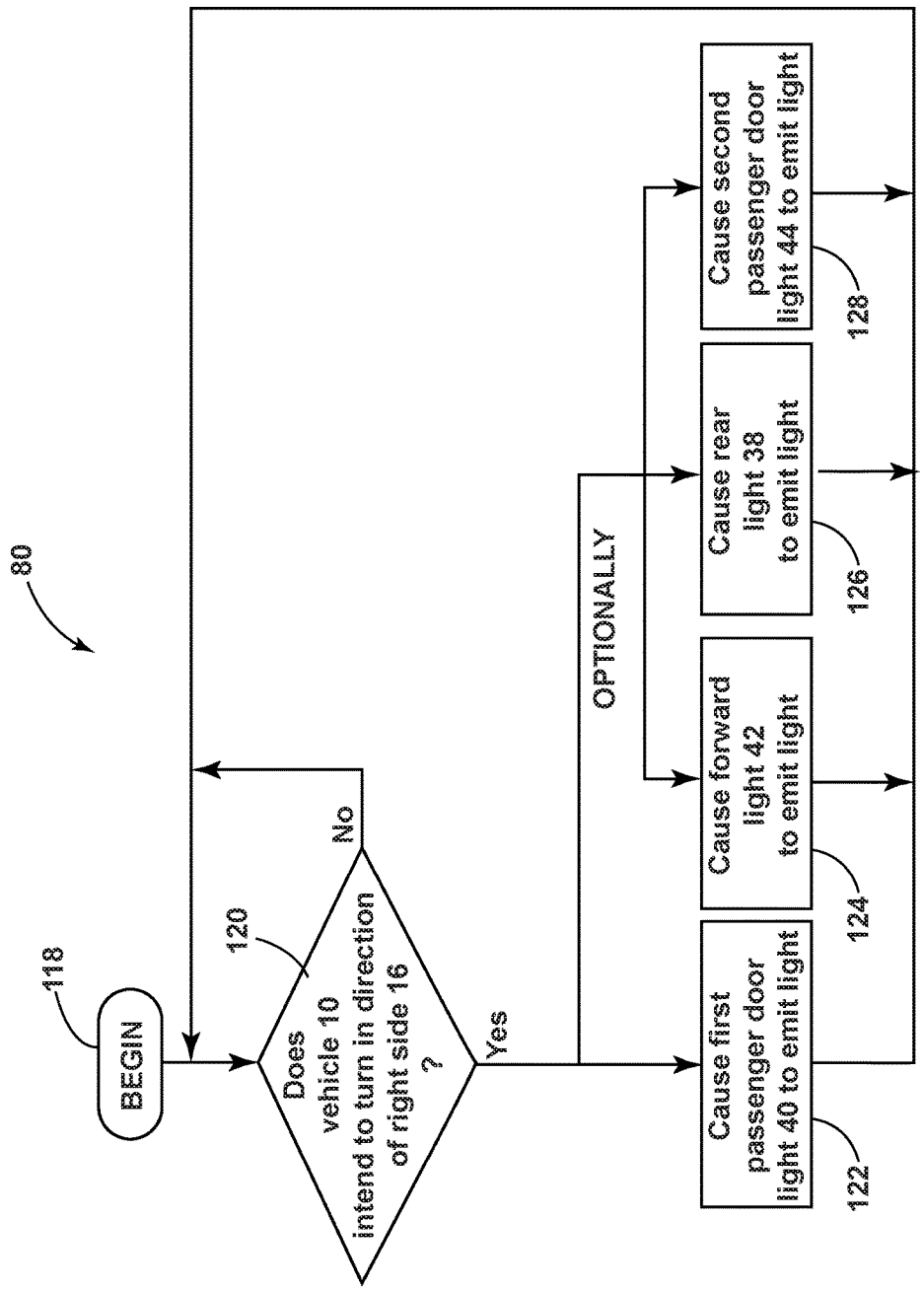
FIG. 12 is a flow chart for a third light control routine utilized by the controller of FIG. 7 to control the lights on the right side of the vehicle of FIG. 1.
Figure 13B:
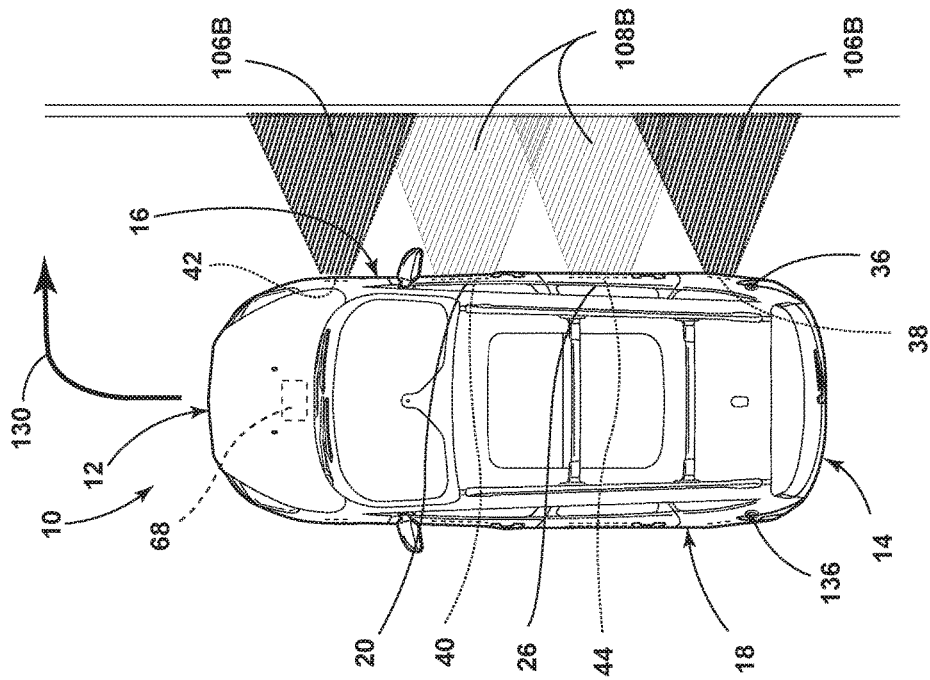
FIG. 13B is an overhead view of the vehicle of FIG. 13, illustrating the first set of lights emitting light in the second color and the second set of lights emitting light in the first color, as part of a continuous sequence alternating between the states shown in FIG. 13A and FIG. 13B.
Figure 13A:
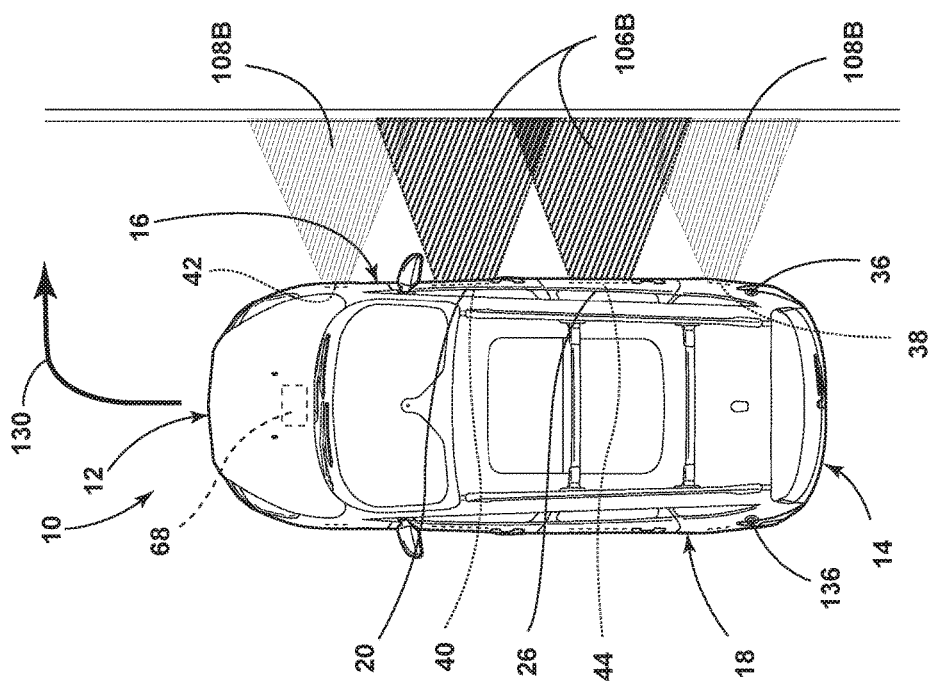
FIG. 13A is an overhead view of the vehicle of FIG. 1, illustrating a first set of lights on the right side emitting light in a first color and second set of lights on the first side emitting light in a second color when the vehicle intends to turn in the direction of the right side.

Referring now to FIGS. 12, 13A, and 13B, the third light control routine 80 begins at step 118. The third light control routine 80 then proceeds to step 120, where it is determined whether the vehicle 10 intends to turn 130 in the direction of the right side 16. If the vehicle 10 is manually operated, the controller 68 determines whether the vehicle 10 intends to turn 130 based on the position of the turn indicator stalk 62. As explained above, if the operator of the vehicle 10 moves the turn indicator stalk 62 to the second position 66, then this information is communicated to the controller 68 and the controller 68 determines that the vehicle 10 intends to turn 130 in the direction of the right side 16. If the vehicle 10 is autonomously operated, the controller 68 determines that the vehicle 10 intends to turn 130 in the direction of the right side 16 based on data provided by the autonomous vehicle control system 74, such as instructions indicating an upcoming turn in the direction of the right side 16. For example, if the autonomous vehicle control system 74 instructs a turn signal located on the front 12 of the vehicle 10 toward the right side 16 to blink to indicate a turn, then the controller 68 can use this data as indication that the vehicle 10 intends to turn 130. If it is determined that the vehicle 10 does not intend to turn 130 in the direction of the right side 16, then the third light control routine 80 returns to the beginning, step 118. However, if it is determined that the vehicle 10 does intend to turn 130 in the direction of the right side 16, then the third light control routine 80 proceeds to step 122. At step 122, the controller 68 causes a light, such as the first passenger door light 40, to emit light in a first color 106B (e.g., the green color). The emitted light can be blinking light. The emitted light can be blinking light alternating between colors, such as between the first color 106B (e.g., the green color) and a second color 108B (e.g., the amber color). Simultaneously with step 122, the third light control routine 80 can optionally proceed to one or more of steps 124, 126, and 128. At step 124, the controller causes the forward light 42 to emit light in any color including the second color 108B (e.g., the amber color). Again the emitted light can be blinking light, including light blinking between alternating colors, such as between the second color 108B (e.g., the amber color) and the first color 106B (e.g., the green color). The controller 68 can cause the first passenger door light 40 and the forward light 42 to alternate blinking light of several colors, such that when the first passenger door light 40 is emitting light of the first color 106B, the forward light 42 is emitting light of the second color 108B, and then when the first passenger door light 40 is emitting light of the second color 108B, the forward light 42 is emitting light of the first color 106B. For example, the controller 68 can cause the first passenger door light 40 to emit a flash in the green color and the forward light 42 to emit a flash in the amber color at the same time. Subsequently, the controller 68 can switch which light emits which color, causing the first passenger door light 40 to emit a flash in the amber color and the forward light 42 to emit a flash in the green color. Simultaneously with step 122, the third light control routine 80 can proceed to step 126. At step 126, the controller 68 causes the rear light 38 to emit light. Again the emitted light can be blinking light, including light blinking between alternating colors, such as the second color 108B (e.g., the amber color) and the first color 106B (e.g., the green color). The color of the light emitted from the rear light 38 can match the color of the light emitted from the forward light 42. For example, when the controller 68 causes the forward light 42 to emit blinking light alternating between the second color 108B and the first color 106B, the controller 68 simultaneously causes the rear light 38 to emit blinking light alternating between the second color 108B and the first color 106B. Simultaneously with step 122, the third light control routine 80 can proceed to step 128. At step 128, the controller 68 causes the second passenger door light 44 to emit light. The light emitted from the second passenger door light 44 can be blinking light alternating between colors such between the first color 106B and the second color 108B, so as to match the blinking light colors emitted by the first passenger door light 40. The third light control routine 80 then returns to the beginning, step 118.

Staggering the alternating colors of the light emitted by the multiple lights in this manner, as illustrated in FIGS. 13A and 13B, when the vehicle 10 intends to turn 130 in the direction of the right side 16, provides increased visual warning of the intended turn 130 in the direction of the turn 130. This increased visual warning is advantageous if another vehicle is traveling adjacent to the vehicle 10 and thus would be in the path of the intended turn 130. The other vehicle could then take evasive measures upon seeing the visual warning.

The third light control routine 80 and the controller 68 can cause the first passenger door light 40, the forward light 42, the rear light 38, and the second passenger door light 44 to emit light in any color of light at steps 122, 124, 126, and 128, respectively, and in any flashing sequence. As another example, at steps 122, 124, 126, and 128, the controller 68 can cause the first passenger door light 40 and the forward light 42 to emit a flash of light in the amber color, while the rear light 38 and second passenger door light 44 are not activated. At a predetermined amount of time later, the controller 68 can deactivate the first passenger door light 40 and the forward light 42, while causing the rear light 38 and the second passenger door light 44 to emit a flash of light in the amber color. The controller 68 can thereafter restart the sequence.

As another example, at steps 122, 124, 126, and 128, the controller can cause the first passenger door light 40 and the second passenger door light 44 to emit a flash of light in the amber color, while the rear light 38 and the forward light 42 are not activated. At a predetermined amount of the time later, the controller 68 can deactivate the first passenger door light 40 and the second passenger door light 44, while causing the rear light 38 and the forward light 42 to emit a flash of light in the amber color. The controller 68 can thus cause staggered flashing in the amber color in various patterns. The controller 68 can thereafter restart the sequence.

Although not separately illustrated, it should be understood that the controller 68 likewise receives, as input, the data generated by the components on the left side 18, including the exterior sensor 136, door handle sensors, and whether the turn indicator stalk 62 is in a position other than the first position 64 indicating a turn to the left side 18. The controller 68 likewise is in communication with and controls the operation of any lights emitting light from the left side 18, including the forward light 142, the rear light 138, the first passenger door light 140, and the second passenger door light 144. The controller 68 likewise utilizes identical light control routines as that described above to operate the left side 18 lights based on the data received from the various left side input generators. In other words, the discussion above pertaining to the right side 16 equally applies to the left side 18.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   a front, a rear, a first side, and a second side;
   a first passenger door located at the first side, a forward wheel located at the first side, and a rear wheel located at the first side;
   a first light capable of emitting light in a first color from the first side between the rear of the vehicle and the rear wheel;
   a second light capable of emitting light in a second color from the first side between the rear wheel and the front of the vehicle;
   a controller in communication with the first light and the second light;
   an exterior sensor that provides data to the controller, which determines whether an object is approaching the first side of the vehicle; and
   the controller causes the first light to emit light in the first color and the second light to emit light in the second color, when the controller determines that an object is approaching the first side, while the vehicle is in a reverse movement state, to provide a visual warning to an operator of the vehicle or to the object approaching the first side, or both, that the object is approaching the first side.

2. The vehicle of claim 1, the first light is capable of emitting flashing light in the first color; and
   the controller causes the first light to emit flashing light in the first color.

3. The vehicle of claim 1 further comprising a third light that is capable of emitting light in the second color from the first side between the forward wheel and the front of the vehicle;
   the controller further causes the third light to emit light in the second color, when the controller determines that the object is approaching the first side, while the vehicle is in the reverse movement state, to provide the visual warning to the operator of the vehicle or to the object approaching the first side, or both, that the object is approaching the first side;
   wherein, the second light emits light from the first passenger door or below the first passenger door.

4. The vehicle of claim 3, the first passenger door and the first side each comprise an external surface and an interior area to the interior of the external surface;
   wherein, the first light emits light from the interior area of the first side;
   wherein, the second light emits light from the interior area of the first passenger door or from the interior area of the first side below the first passenger door; and
   wherein, the third light emits light from the interior area of the first side.

5. The vehicle of claim 3 further comprising:
   a second passenger door located at the first side between the first passenger door and the rear of the vehicle; and
   a fourth light that is capable of emitting light in the second color, from the second passenger door or from below the second passenger door;
   the controller further causes the fourth light to emit light in the second color, when the controller determines that the object is approaching the first side, while the vehicle is in the reverse movement state, to provide a visual warning to the operator of the vehicle or to the object approaching the first side, or both, that the object is approaching the first side.

6. A vehicle comprising:
a front, a rear, a first side, and a second side;
a passenger door located at the first side, the passenger door comprising an interior door handle and a door handle sensor; and
a light capable of emitting light from the first side; and
a controller in communication with the door handle sensor and the light;
wherein the controller causes the light to emit light from the first side when the controller, based on data from the door handle sensor, determines that a hand of a passenger is touching the interior door handle, to provide either a visual warning to another moving vehicle that the passenger door will open or a visual reminder to the passenger to look for another object that is traveling in a path that the first door would impede if opened, or both.

7. The vehicle of claim 6, wherein the door handle sensor is a capacitive sensor.

8. The vehicle of claim 6, wherein the light emits light of a red color.

9. The vehicle of claim 8, wherein the light emits flashing light of the red color.

10. The vehicle of claim 6, wherein the light emits light from the passenger door.

11. The vehicle of claim 10, the passenger door comprising an external surface and an interior area to the interior of the external surface;
wherein the light emits light from the interior area of the passenger door.

12. The vehicle of claim 6, wherein the light emits light from below the passenger door.

13. The vehicle of claim 6, wherein the light emitted provides a visual warning to another moving vehicle that the passenger door will open.

14. The vehicle of claim 6, wherein the light emitted provides a visual reminder to the passenger to look for another object that is traveling in a path that the passenger door would impede if opened.

15. A vehicle comprising:
an interior, a front, a rear, a first side, a second side, and a first passenger door at the first side;
a first light capable of emitting light from either the first passenger door or below the first passenger door; and
a controller in communication with the first light;
wherein the controller causes the first light to emit light blinking light alternating between a first color and a second color from either the first passenger door or below the first passenger door when the controller determines that the vehicle intends to turn in a direction of the first side, to provide visual warning that the vehicle intends to turn in the direction of the first side.

16. The vehicle of claim 15 further comprising:
a forward wheel at the first side; and
a second light in communication with the controller and capable of emitting light from the first side between the forward wheel and the front of the vehicle;
wherein, the controller further causes the second light to emit blinking light alternating between the first color and the second color;
wherein, when the first light emits light in the first color, the second light emits light in the second color; and
wherein, when the second light emits light in the first color, the first light emits light in the second color.

17. The vehicle of claim 16 further comprising:
a rear wheel at the first side; and
a third light in communication with the controller, located at the first side between the rear wheel and the rear of the vehicle;
wherein, the controller further causes the third light to emit blinking light alternating between the first color and the second color; and
wherein, third light emits light of the first color when the second light emits light of the first color.

18. The vehicle of claim 17, the interior comprising a turn indicator stalk in communication with the controller;
wherein the turn indicator stalk has a first position when an operator of the vehicle does not intend to turn the vehicle and a second position when the operator of the vehicle intends to turn the vehicle; and
the controller determines that the vehicle intends to turn in the direction of the first side because the turn indicator stalk is in the second position.

19. The vehicle of claim 17 further comprising:
a second passenger door located at the first side between the first passenger door and the rear of the vehicle; and
a fourth light, in communication with the controller, capable of emitting light from the second passenger door or from the first side below the second passenger door;
wherein, the vehicle is an autonomous vehicle further comprising an autonomous vehicle control system that instructs the vehicle to indicate an upcoming turn in the direction of the first side;
wherein, the controller determines that the vehicle intends to turn in the direction of the first side, based on data received from the autonomous vehicle control system;
wherein, the controller further causes the fourth light to emit blinking light alternating between the first color and the second color; and
wherein, the fourth light emits light of the first color when the first light emits light of the first color.

20. The vehicle of claim 17 further comprising:
a second passenger door located at the first side between the first passenger door and the rear of the vehicle; and
a fourth light, in communication with the controller, capable of emitting light from the second passenger door or from the first side below the second passenger door;
wherein, the controller further causes the fourth light to emit blinking light alternating between the first color and the second color; and
wherein, the fourth light emits light of the first color when the first light emits light of the first color.

* * * * *